No. 713,460. Patented Nov. 11, 1902.
T. S. LEESE.
REGENERATIVE GAS LAMP.
(Application filed July 5, 1902.)
(No Model.)
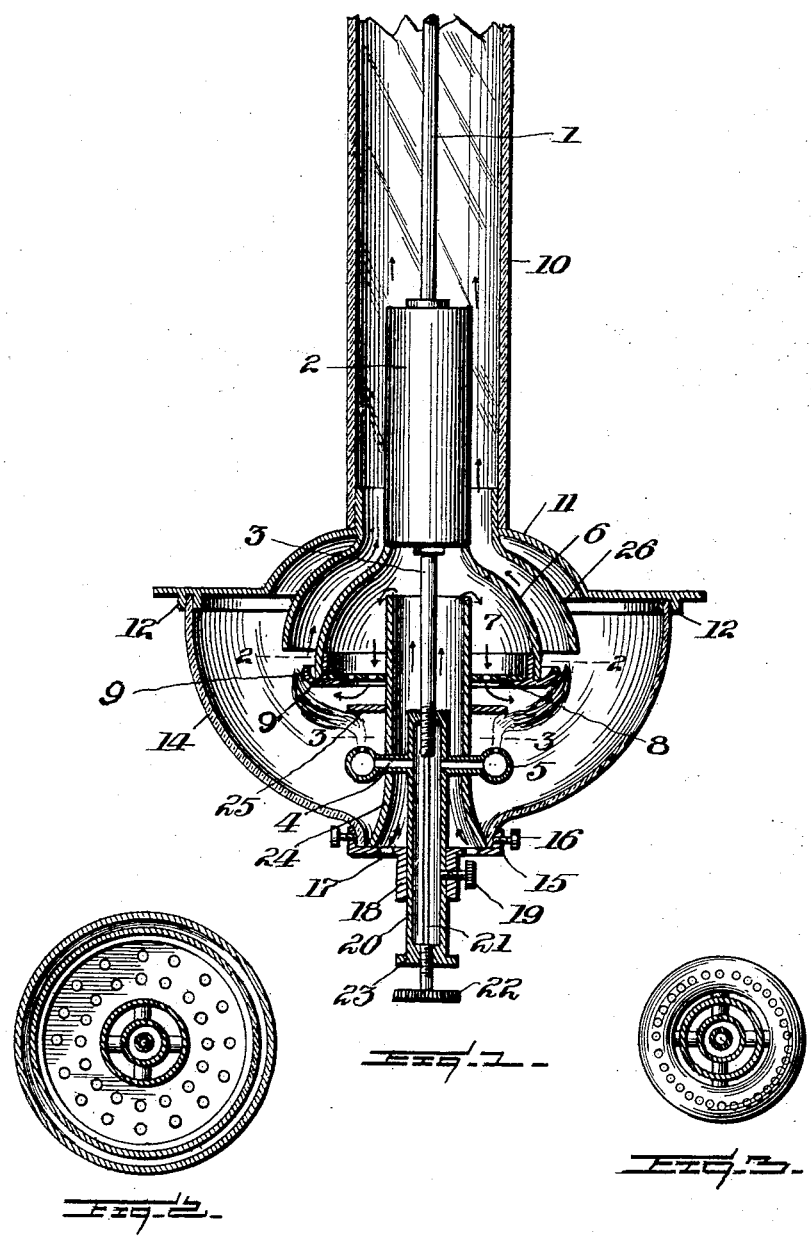
Witnesses:
Inventor,
T. S. Leese,
By
Attorneys

UNITED STATES PATENT OFFICE.

THADDEUS S. LEESE, OF BELLVIEW, PENNSYLVANIA.

REGENERATIVE GAS-LAMP.

SPECIFICATION forming part of Letters Patent No. 713,460, dated November 11, 1902.

Application filed July 5, 1902. Serial No. 114,439. (No model.)

*To all whom it may concern:*

Be it known that I, THADDEUS S. LEESE, a citizen of the United States of America, residing at Bellview, in the county of Allegheny and State of Pennsylvania, have invented certain new and useful Improvements in Regenerative Gas-Lamps, of which the following is a specification, reference being had therein to the accompanying drawings.

This invention relates to certain new and useful improvements in gas-lamps, and relates more particularly to regenerative gas-lamps.

The present invention has for its object the provision of novel means whereby a uniform and steady light is produced; furthermore, to provide a lamp wherein the gas may be economically used and regulated.

My invention also contemplates to provide a central draft directed into the air-heating chamber, heated air generated therein to be deflected downwardly upon the flame at a point of ignition, where said flame is spread, and drawn upwardly between the outer walls of said heating-chamber and the inner walls of the bell-shaped mouth, which space directly communicates with the chimney.

Another novel feature of my invention resides in the position of the regenerating-chamber, wherein the gas is superheated, this chamber being so arranged that the same will be heated from all sides.

A still further object of the invention is to provide a device of the above-described character which will be extremely simple, strong, durable, comparatively inexpensive to manufacture, and highly efficient in its use.

With the above and other objects in view the invention consists in the novel construction, combination, and arrangement of parts, to be hereinafter more fully described, and specifically pointed out in the claims.

In describing the invention in detail reference is had to the accompanying drawings, forming a part of this specification, and wherein like numerals of reference indicate like parts throughout the several views, in which—

Figure 1 is a vertical sectional view of my improved lamp. Fig. 2 is a horizontal sectional view taken on the line 2 2 of Fig. 1. Fig. 3 is a similar view taken on the line 3 3 of Fig. 1.

In the drawings the reference-numeral 1 represents the gas-supply pipe, which communicates with the regenerative chamber 2, wherein the gas is superheated. From the lower end of said regenerative chamber extends a supply-pipe 3, which is connected to the spider 4, extending into the annular burner 5, having a series of openings formed therein through which the gas flows. To the lower end of the regenerating-chamber is also secured the bell-shaped casing 6, which forms the hot-air chamber 7, wherein the air is heated and deflected downwardly. The perforated plate 8 rests upon the securing-flanges 9, the latter being formed integral with a collar 9', engaging the interior of the bell-shaped casing 6, forming means for attaching the plate to the lower end of the bell-shaped casing. The chimney 10 rests by its lower end on the hood 11, the latter carrying on its under face the annular flanges 12, between which the globe 14 is secured. A securing-ring 15 encircles the lower portion of the globe, said ring carrying set-screws 16, said ring 15 being formed integral with the spider 17, through which the air passes, said spider carrying a collar 18, having secured therein a set-screw 19, said collar 18 surrounding the pipe 20, connected to the gas-supply pipe 3. In this pipe 20 extends the needle-valve 21, carrying the head 22, said valve extending through the bushing 23, secured at the lower end of the pipe 20. A central air-tube 24, through which the spider of the burner extends, is also secured to the perforated plate 8 and extends a distance above the same, this central draft-chimney carrying annular spreader 25. The hood 11 also carries a depending inner shell 26, which corresponds with the bell-shaped casing and the heating-chamber 7, allowing a uniform space between the outer and inner walls of the casing 6 and shell 26.

The operation of my improved device is as follows: The gas flowing through the inlet-pipe 1 into the regenerating-chamber 2 will be superheated in said chamber by means of the hot air and burned gases extending around the sides and top of said regenerating-chamber and by means of the hot air in the hot-air chamber 7 coming in contact with the bottom of said regenerating-chamber. From this chamber the gas passes downwardly through the supply-pipe 3 into the burner, where it is under control and regulated by the needle-valve 21. The gas passing through the burner is then ignited and will be drawn upwardly between the outer walls of the bell-shaped casing 6 and the inner walls of the shell 26, the burned gases passing up through the chimney. The cold air is taken in through the central casing 24 into the hot-air chamber 7, where it is heated, and is then deflected downwardly through the perforated plate 8, coming in contact with the flame and mixing with the same, thereby producing a perfectly steady clear incandescent light.

It will be further noted that by the peculiar arrangement of the draft in my improved burner a perfect combustion is obtained at all times, irrespective of the size of the flame, preventing the smoke and obviating the clogging of the various channels caused by the unconsumed particles of carbon that would otherwise be produced.

The many other advantages obtained by the use of my improved device will be readily apparent from the foregoing description taken in connection with the accompanying drawings.

It will be noted that various changes may be made in the details of construction without departing from the general spirit of my invention.

Having fully described my invention, what I claim as new, and desire to secure by Letters Patent, is—

1. In a device of the type set forth, a central air-tube, a pipe arranged on the interior thereof, a spider connected to the pipe and extending through the air-tube, a supply-pipe connected to the said pipe, and a foraminous spider covering the lower end of the air-tube.

2. In a device of the type set forth, an air-tube having a burner located on its interior and extending through the tube, a perforated plate surrounding said air-tube, a bell-shaped casing carrying said plate, and an inner shell spaced from said casing.

3. In a central-draft lamp, the combination of a chimney, a globe having a hood forming a tight connection between said globe and chimney, a gas-inlet pipe, a regenerating-chamber communicating therewith, a supply-pipe communicating with the lower portion of said regenerating-chamber, a burner communicating with said supply-pipe, a bell-shaped casing secured to the lower end of said regenerating-chamber, and a spreader arranged above said burner, substantially as described.

4. In a lamp, the combination of a central draft-tube, a bell-shaped casing extending over the top of said central draft-tube, a regenerating-chamber arranged above and secured to the upper end of said bell-shaped casing, a burner communicating with said regenerating-chamber surrounding the lower portion of said central draft-tube, and a casing surrounding said bell-shaped casing forming a space in which the products of combustion are carried upwardly, substantially as described.

5. In a lamp, the combination of a chimney and globe, a tight connection formed between said chimney and globe, a central draft-tube, a spreader secured to said tube, a horizontal burner extending through and encircling the lower portion of said central draft-tube, a casing forming a hot-air chamber surrounding the upper end of said central draft-tube, and a casing surrounding said bell-shaped casing and connected to said chimney, substantially as described.

6. In a lamp, the combination of a gas-supply pipe, a regenerating-chamber connected therewith, a supply-pipe connected to the lower end of said regenerating-chamber communicating with the burner, a central air-tube, a bell-shaped casing forming a hot-air chamber below said regenerating-chamber, a perforated plate secured to the lower portion of said bell-shaped casing, and a casing surrounding said hot-air chamber, forming a space in which the products of combustion are carried upwardly, substantially as described and for the purpose set forth.

7. A device of the type set forth, consisting of an air-tube having a burner connected thereto, a regenerating-chamber, an air-tube, a globe surrounding the air-tube, and an inner casing located within the globe.

8. A device of the type set forth, consisting of an air-tube, a burner, a supply-pipe extending within the air-tube and connected to the burner, and spaced casings with the space between the casings in communication with said air-tube.

9. In a device of the type set forth, an air-tube having a supply-pipe on its interior, with a spider connected to said pipe and extending without the air-tube.

10. In a device of the type set forth, an air-tube carrying a spider at its lower end, a globe connected to the spider and having a hood closing its upper end, and casings spaced apart with the air-tube extending into the inner casing whereby the air is directed downwardly and then upwardly between said casings.

11. In a device of the type set forth, an air-tube with a regenerating-chamber supporting the same, a pipe on the interior of the air-tube connected to said chamber and carrying a spider extending without the air-tube, a foraminous plate on the air-tube with a casing connected thereto and to said chamber, and a second casing spaced from the first-named one.

In testimony whereof I affix my signature in the presence of two witnesses.

THADDEUS S. LEESE.

Witnesses:
JOHN NOLAND,
E. E. POTTER.